United States Patent
Kim et al.

(10) Patent No.: US 11,954,324 B2
(45) Date of Patent: Apr. 9, 2024

(54) METHOD FOR PERFORMING VIRTUAL USER INTERACTION, AND DEVICE THEREFOR

(71) Applicant: SAMSUNG ELECTRONICS CO., LTD., Suwon-si (KR)

(72) Inventors: Seungnyun Kim, Suwon-si (KR); Hyunjun Kim, Suwon-si (KR); Yongsang Yun, Suwon-si (KR); Heonjun Ha, Suwon-si (KR); Chanmin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/099,441

(22) Filed: Jan. 20, 2023

(65) Prior Publication Data

US 2023/0152963 A1 May 18, 2023

Related U.S. Application Data

(63) Continuation of application No. PCT/KR2021/009382, filed on Jul. 21, 2021.

(30) Foreign Application Priority Data

Jul. 22, 2020 (KR) .................. 10-2020-0091148

(51) Int. Cl.
*G06F 3/04883* (2022.01)
*G06F 3/01* (2006.01)
(Continued)

(52) U.S. Cl.
CPC .......... *G06F 3/04883* (2013.01); *G06F 3/016* (2013.01); *G06F 3/03545* (2013.01); *G06F 3/0383* (2013.01); *G06F 3/0425* (2013.01)

(58) Field of Classification Search
CPC .. G06F 3/014; G06F 3/017; G06F 2203/0331; G06F 3/011; G06F 3/016; G06F 3/0346; G06F 3/03545
See application file for complete search history.

(56) References Cited

U.S. PATENT DOCUMENTS 6,674,895 B2    1/2004    Rafii et al.
8,570,274 B1 * 10/2013    McIntosh .............. G06F 1/1698
                                                        345/173
(Continued)

FOREIGN PATENT DOCUMENTS

JP      3278150      4/2002
JP      4989383      8/2012
(Continued)

OTHER PUBLICATIONS

International Search Report dated Nov. 5, 2021 in PCT/KR2021/009382, 5 pages.
(Continued)

*Primary Examiner* — Sanjiv D. Patel
(74) *Attorney, Agent, or Firm* — NIXON & VANDERHYE P.C.

(57) ABSTRACT

Disclosed is an electronic device comprising: a communication unit comprising communication circuitry configured to communicate with an input device; a camera; and at least one processor operably connected to the communication unit and the camera, wherein the at least one processor is configured to: determine whether a condition for generating a virtual input interface is satisfied, generate the virtual input interface on based on the determination, acquire information about the movement of the input device through the communication unit and/or the camera, and transmit, to the input device, feedback information about the movement of the
(Continued)

input device, generated on the virtual input interface, through the communication unit.

15 Claims, 15 Drawing Sheets

(51) Int. Cl.
*G06F 3/0354* (2013.01)
*G06F 3/038* (2013.01)
*G06F 3/042* (2006.01)

(56) References Cited

U.S. PATENT DOCUMENTS

| | | | |
|---|---|---|---|
| 8,749,573 B2 | 6/2014 | Ali et al. | |
| 9,367,960 B2 | 6/2016 | Poulos et al. | |
| 9,395,811 B2 | 7/2016 | Vaught et al. | |
| 9,759,917 B2 | 9/2017 | Osterhout et al. | |
| 10,261,595 B1* | 4/2019 | Kin | G06F 3/04815 |
| 10,281,981 B2 | 5/2019 | Kim et al. | |
| 2006/0177112 A1 | 8/2006 | Yang et al. | |
| 2009/0066725 A1 | 3/2009 | Nogami et al. | |
| 2012/0249741 A1 | 10/2012 | Maciocci et al. | |
| 2014/0078043 A1* | 3/2014 | Kim | G06F 3/011 345/156 |
| 2018/0095635 A1 | 4/2018 | Valdivia et al. | |
| 2018/0200619 A1 | 7/2018 | Guillotel et al. | |
| 2018/0350150 A1 | 12/2018 | Powderly et al. | |
| 2019/0265781 A1* | 8/2019 | Kehoe | G06F 3/0304 |
| 2019/0265792 A1 | 8/2019 | Wu | |
| 2019/0354201 A1* | 11/2019 | Rapoport | G06F 3/0304 |
| 2019/0385376 A1 | 12/2019 | Kim et al. | |
| 2020/0125235 A1 | 4/2020 | Eiten et al. | |
| 2021/0048897 A1 | 2/2021 | Munakata et al. | |

FOREIGN PATENT DOCUMENTS

| | | |
|---|---|---|
| JP | 2018-527655 | 9/2018 |
| JP | 6469752 | 2/2019 |
| JP | WO2019/220803 | 11/2019 |
| KR | 10-2006-0089596 | 8/2006 |
| KR | 10-2015-0054825 | 5/2015 |
| KR | 10-2016-0072306 | 6/2016 |
| KR | 10-2019-0053278 | 5/2019 |
| KR | 10-2019-0101323 | 8/2019 |
| KR | 10-2019-0101886 | 9/2019 |
| KR | 10-2020-0010296 | 1/2020 |
| WO | 2018/204419 | 11/2018 |

OTHER PUBLICATIONS

Written opinion Report dated Nov. 5, 2021 in PCT/KR2021/009382, 4 pages.

* cited by examiner

METHOD FOR PERFORMING VIRTUAL USER INTERACTION, AND DEVICE THEREFOR

CROSS-REFERENCE TO RELATED APPLICATIONS

This application is a continuation of International Application No. PCT/KR2021/009382 designating the United States, filed on Jul. 21, 2021, in the Korean Intellectual Property Receiving Office and claiming priority to Korean Patent Application No. 10-2020-0091148, filed on Jul. 22, 2020, in the Korean Intellectual Property Office, the disclosures of which are incorporated by reference herein in their entireties.

BACKGROUND

Field

The disclosure relates to a method and an apparatus for providing a realistic user interface environment to a user who wears an electronic device.

Description of Related Art

Virtual reality (VR) may refer to technology that artificially produces a virtual environment that is similar to a real environment but does not really exist, using an electronic device such as a computer. Augmented reality (AR) may refer to technology that combines a virtual object or information with a real existing environment so that the object or information is shown as if it would originally exist in the environment. Mixed reality (MR) may refer to technology that mixes the advantages of AR and VR so as to combine virtual information and the real world.

VR and AR may be embodied representatively via a head mounted display (HMD). The HMD is a display device that is worn on the head part of a user and directly provides an image in front of the eyes of the user.

An input device such as a pen may interoperate with an electronic device and may be utilized for a VR, AR, or MR content.

In the case of the use of virtual reality (VR) or augmented reality (AR), a detailed scenario that provides various user interactions via an input device such as a pen and a method of offering convenience for input via interoperation with an application shown in a virtual screen may be insufficient. In addition, an additional UI design for delicate user input such as inputting letters is needed.

SUMMARY

Embodiments of the disclosure may provide a UI/UX that supports user input in a 3D space when a user experiences AR or MR so that the user is capable of feeling an experience in the real word, and may provide a variety of intuitive user interactions by combining with the functions and information of an input device such as a pen.

An electronic device according to an example embodiment may include: a communication unit, including communication circuitry, configured to communicate with an input device, a camera, and at least one processor operatively connected to the communication unit and the camera, wherein the at least one processor may be configured to: determine whether a condition for producing a virtual input interface is satisfied, produce the virtual input interface based on the determination, obtain information associated with a movement of the input device via at least one of the communication unit or the camera, and transmit, to the input device via the communication unit, feedback information associated with the movement of the input device occurring in the virtual input interface.

A method of operating an electronic device according to an example embodiment may include: determining whether a condition for producing a virtual input interface is satisfied, producing, based on the determination, the virtual input interface, obtaining information associated with a movement of an input device via at least one of a communication unit or a camera, and transmitting, to the input device via the communication unit, a control signal determined based on the movement of the input device occurring in the virtual input interface and to control the input device.

According to various example embodiments, the usability of an input device may be increased by providing a user input function to be utilized for an AR/VR content using the input device, and a user input experience may be enhanced by providing a virtual input interface-based visually effective space and tactical haptic feedback.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

An electronic device according to various example embodiments disclosed may be one of the various types of devices. The electronic device may include, for example, a portable communication device (e.g., a smartphone), a head mounted display (HMD) device that is worn on the head of a user and moves when the head moves, an audio output device (e.g., a headphone or earphone), smart glasses, or a terminal device. The electronic device according to various embodiments is not limited to the above-described devices.

Figure 1:
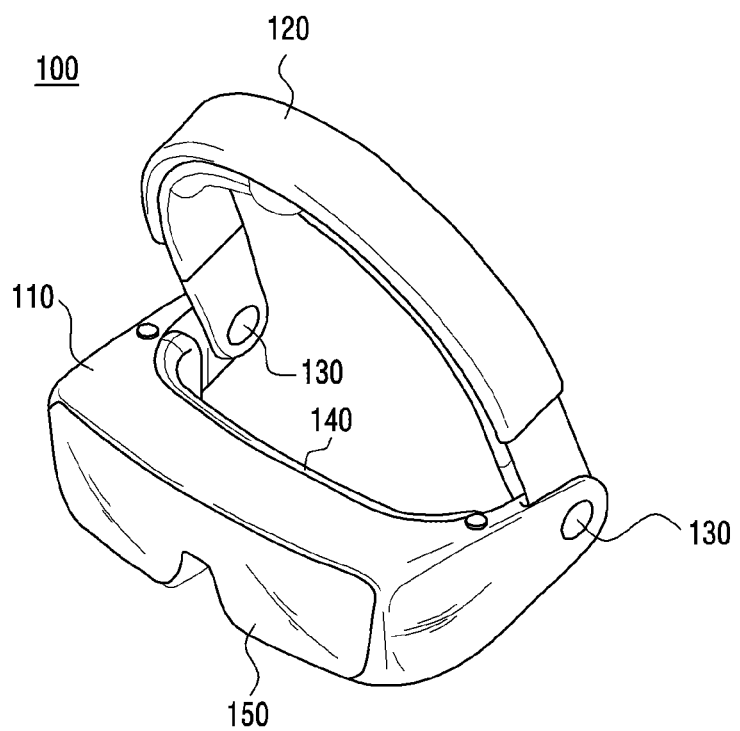
FIG. 1 is a perspective view of an HMD device according to various embodiments.

FIG. 1 is a perspective view of an electronic device 100 according to various embodiments.

According to an embodiment, the electronic device 100 of FIG. 1 may be an HMD device. Referring to FIG. 1, the electronic device 100 may include a body 110, a strap 120 that is connected with the body so as to fix the electronic device 100 to a user body part (e.g., the head or the like), and a pad 140 that is configured to be in contact with the skin around the eyes on the face of the user. The body 110 and the strap 120 are mechanically connected to each other via a connection part (e.g., a hinge) 130.

According to an embodiment, the body 110 may include a display 150 in the front side. The HMD device 110 may display, in the display 150, a virtual input interface in the form of mixed reality (MR), augmented reality (AR), or virtual reality (VR). For example, the virtual input interface may include the form of a note, a canvas, or an application execution window that is capable of receiving a user input, and may be provided based on an application being executed or a service being provided in the electronic device 100.

According to an embodiment, the electronic device 100 may include a communication unit (e.g., including communication circuitry). According to an embodiment, the electronic device 100 may communicate with an input device via the communication unit. According to an embodiment, the communication unit may be a wireless communication unit (e.g., a cellular communication unit, a short-range wireless communication unit, or a global navigation satellite system (GNSS) communication unit). The electronic device 100 may communicate with an input device via a short-range communication network such as Bluetooth, WiFi direct, or an infrared data association (IrDA), or may communicate with an input device via a long-distance communication network such as a cellular network, the Internet, or a computer network. For example, the electronic device 100 may perform pairing with an input device such as an electronic pen, and may communicate with the paired input device. For example, the electronic device 100 may receive information associated with a movement of an input device from the input device via the communication unit. Based on the information received via the communication unit, the electronic device 100 may apply a movement of the input device to a content that is being displayed or executed in the electronic device 100. According to an embodiment, the electronic device 100 may receive a rendered image from an external device via the communication unit, and may display the same in the display 150. For example, the electronic device 100 may receive a rendered image from an external device such as a mobile phone or a server. According to an embodiment, the electronic device 100 may transfer movement information received from an input device to an external device, and may receive an image rendered based on the movement of the input device from the external device.

According to an embodiment, the display 150 may be formed of a transparent material not to block the field of view of a user. For example, the user may recognize the outside of the electronic device 100 via penetration of the transparent material. For example, the electronic device 100 may provide augmented reality (AR) to a user by providing a virtual object or information combined with or added to a reality or existing environment via the display 150 formed of a transparent material.

According to various embodiments of the disclosure, the electronic device 100 may be provided in the form of glasses or goggles, but the form is not limited if the electronic device 100 is capable of providing mixed reality (MR), augmented reality (AR), or a virtual reality (VR).

Figure 2A:
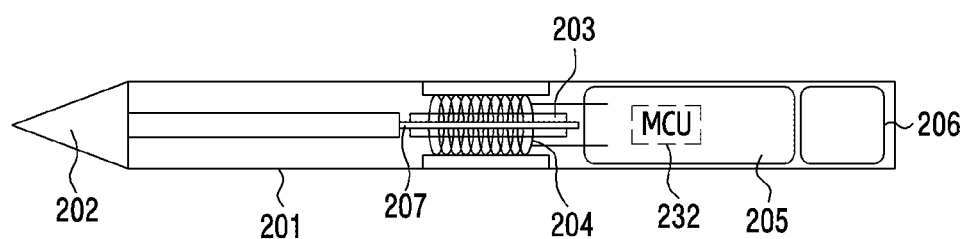
FIG. 2A is a sectional view of an input device according to various embodiments.

FIG. 2A is a sectional view of an input device according to various embodiments.

Referring to FIG. 2A, an input device 200 may include a housing 201, a stylus 202, a magnet 203, a solenoid coil 204, a circuit board 205, a battery 206, and a spindle 207 fixed in the housing. The input device 200 may be provided in the form of a pen that a user grips and uses.

According to an embodiment, the housing 201 has an elongated shape and has an accommodating space therein. The housing 201 may include synthetic resins (e.g., plastic) and/or metallic materials (e.g., aluminum).

According to an embodiment, if a current flows through the solenoid coil 204, electromagnetic force is caused, and thus a magnet connected with the end of the stylus 202 and the external device 200 may vibrate.

According to an embodiment, the magnet 203 of the input device 200 may be inserted into the stylus 202 or into the spindle 207 fixed in the housing and may vibrate along the spindle 207.

According to an embodiment, a micro controller unit (MCU) (e.g., including control circuitry) 232 may be disposed on the circuit board 205. According to an embodiment, the input device 200 may include a haptic module (not illustrated). For example, a haptic module may include various haptic circuitry and cause vibration in the input device 200, and may include the magnet 203. According to an embodiment, the MCU 232 may control a haptic module based on information obtained from the electronic device 100. For example, the electronic device 100 may transmit, to the input device 200, a control signal determined based on a movement of the input device 200, and the MCU 232 of the input device 200 may control a haptic module based on a received control signal.

According to an embodiment, the input device 200 may include a battery seating area in which the battery 206 is disposed. The battery 206 that may be mounted in the battery seating area may include, for example, a cylinder type of battery.

Figure 2B:
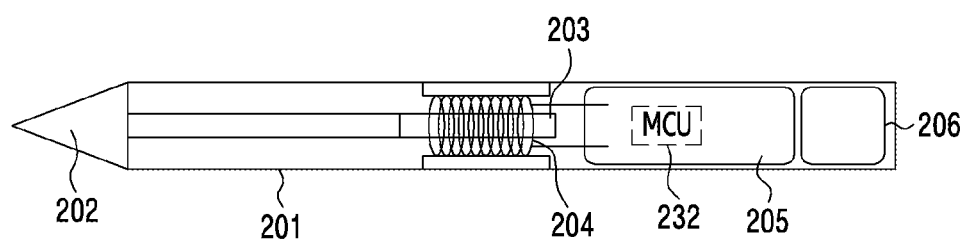
FIG. 2B is a sectional view of an input device according to various embodiments.

FIG. 2B is a sectional view of an input device according to various embodiments. The description of FIG. 2B that corresponds to or is the same as or similar to the description that has been provided above may not be repeated.

Referring to FIG. 2B, in the case of an input device 210, the magnet 203 of the input device 210 may be provided in a manner of being fixed to the stylus 202.

A haptic module (not illustrated) according to various embodiments may produce a haptic signal that provides directionality via one or more vibrating plates and an actuator. In the case that the input device 200 is beyond an effective range of a virtual input interface (e.g., a virtual input pad), the input device 200 may produce haptic feedback that guide the input device in the direction of the effective range.

Figure 2C:
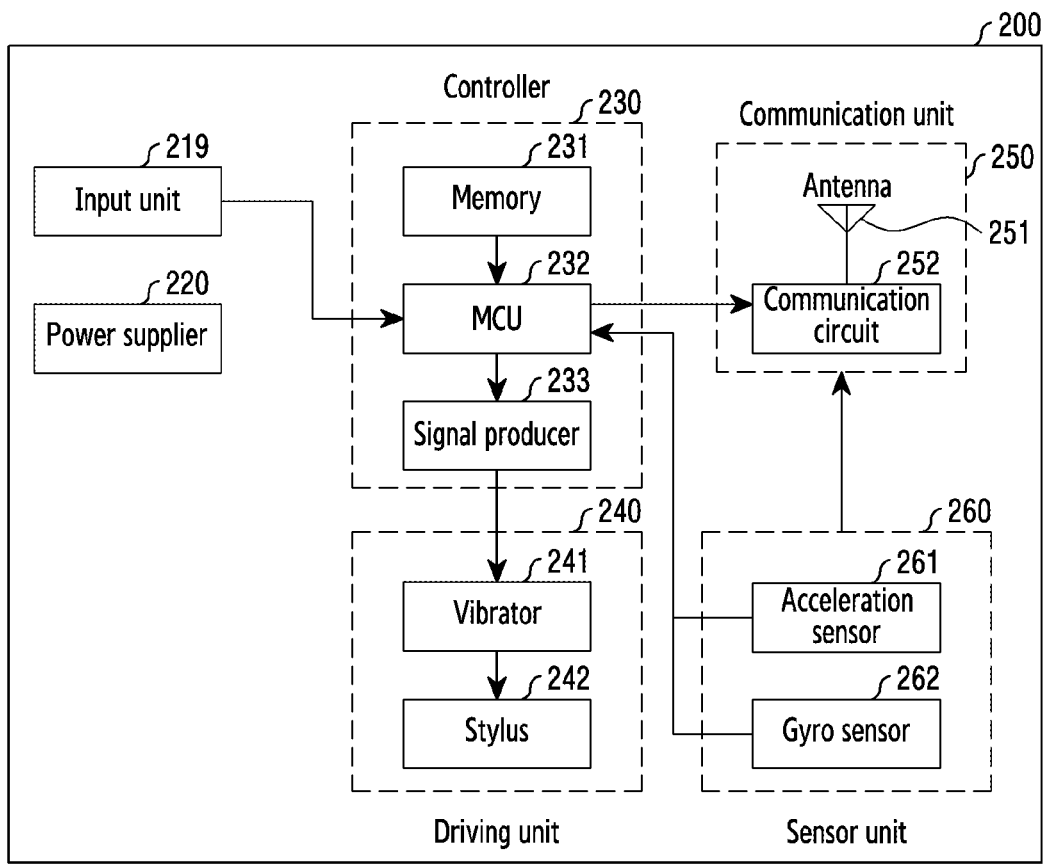
FIG. 2C is a block diagram illustrating an example configuration of an input device according to various embodiments.

FIG. 2C is a block diagram illustrating an example configuration of the input device 200 according to various embodiments.

Referring to FIG. 2C, the input device 200 may include an input unit (e.g., including input circuitry) 219, a power supplier (e.g., including power supply circuitry) 220, a controller (e.g., including processing and/or control circuitry) 230, a driving unit (e.g., including driving circuitry) 240, a communication unit (e.g., including communication circuitry) 250, and/or a sensor unit (e.g., including a sensor) 260.

According to an embodiment, the input unit 219 may include various circuitry and components that receive a command or data to be used for elements of the input device 200 from the outside (e.g., a user). The input unit 219 may include at least one dome switch, jog wheel, jog switch, or touch pad, and is not limited thereto.

According to an embodiment, the power supplier 220 may include various power supply circuitry and supply power to at least one element of the input device 200. According to an embodiment, the power supplier 220 may include the battery 206 of FIG. 2A. For example, the battery 206 may include a disposable primary battery, a rechargeable secondary battery, or a fuel cell.

According to an embodiment, the controller 230 may include various circuitry, including a memory 231, an MCU 232, and/or a signal producer 233. In addition, other elements may be further included in the controller 230. According to an embodiment, the controller 230 may electrically or operatively connected to the input unit 219, the power supplier 220, the driving unit 240, the communication unit 250, and/or the sensor unit 260.

According to an embodiment, the memory 231 may store a variety of data used by at least one element of the input device 200. Data may include, for example, software, and input data or output data associated with a command related to the software. The memory 231 may include volatile memory and/or non-volatile memory.

The MCU 232 may include various processing and/or control circuitry and execute, for example, software so as to control at least one other element of the input device 200 connected to the MCU 232, and may perform various data processing or operations. According to an embodiment, at least a part of the data processing or operations, the MCU 232 may load commands or data received from another element (e.g., the input unit 219, the communication unit 250, or the sensor unit 260) in volatile memory, may process commands or data stored in the volatile memory, and may store result data in non-volatile memory. According to an embodiment, based on information received from the electronic device 100 via the input unit 219 or the communication unit 250, the MCU 232 may transmit a control signal or a command to the signal producer 233.

According to an embodiment, the signal producer 233 may include various circuitry and produce a vibration signal corresponding to the control signal or command received from the MCU 232, and may include an amplifier.

According to an embodiment, the driving unit 240 may include various circuitry including a vibrator 241 and a stylus 242.

According to an embodiment, the vibrator 241 (e.g., the magnet 203 and solenoid coil 204 of FIG. 2A) may vibrate the stylus 242 (e.g., the stylus 202 of FIG. 2A) and may provide variable normal force to the stylus 242. To this end, based on a vibration signal produced by the signal producer 233, the vibrator 241 may vibrate the stylus 242 in the longitudinal direction. The vibrator 241 may be embodied using a linear resonant actuator (LRA) and a solenoid scheme according to various embodiments, and may be embodied as the vibrator 241 of the input device 200 using the solenoid scheme that has a simple structure between the schemes.

According to an embodiment, the communication unit 250 may include an antenna 251 and a communication circuit 252. The input device 200 may transmit the state information (e.g., sensor information) of the input device 200 or input information to the electronic device 100 via the communication unit 250. For example, a communication circuit 252 may support short-range communication such as Bluetooth (BT), Bluetooth low energy (BLE), or wireless fidelity (WiFi).

According to an embodiment, the antenna 251 may be used for transmitting a signal or power to the outside (e.g., the electronic device 100) or may be used for receiving a signal or power from the outside. According to an embodiment, the input device 200 may include at least one antenna 251, and may select at least one antenna 251 based on a communication scheme supported by the communication circuit 252. Via the at least one selected antenna 251, the communication circuit 250 may exchange a signal or power with the electronic device 100.

According to an embodiment, in the case that the communication circuit 252 supports BLE communication, the communication circuit 252 may operate as a slave BLE controller that performs BLE communication connection and wireless communication with a master BLE controller (e.g., the communication unit of the electronic device 100). For example, based on whether the input device 200 (e.g., a pen) is inserted into the electronic device 100 (e.g., a UE) or based on a button input, the input device 200 may control whether to activate an acceleration sensor 261 and a gyro sensor 262, and may transmit, to the electronic device 100, data (e.g., sensing data) based on information received from the acceleration sensor 261 and the gyro sensor 262. As another example, the input device 200 may exchange, with the electronic device 100, information based on input received via the input unit 219.

According to an embodiment, the sensor unit 260 may include at least one sensor, such as, for example, and without limitation, an acceleration sensor 261 and/or a gyro sensor 262.

According to an embodiment, when the gyro sensor 261 may be activated when the input device 200 (e.g., a pen) is detached from an accommodating area of the electronic device 100 or when input is received via the input unit 219, and may sense acceleration information based on a movement of the input device 200.

According to an embodiment, the gyro sensor 262 may be activated when the input device 200 is detached from the accommodating area of the electronic device 100 or when input is received via the input unit 219, and may sense rotation information based on a movement of the input device 200.

Figure 3:
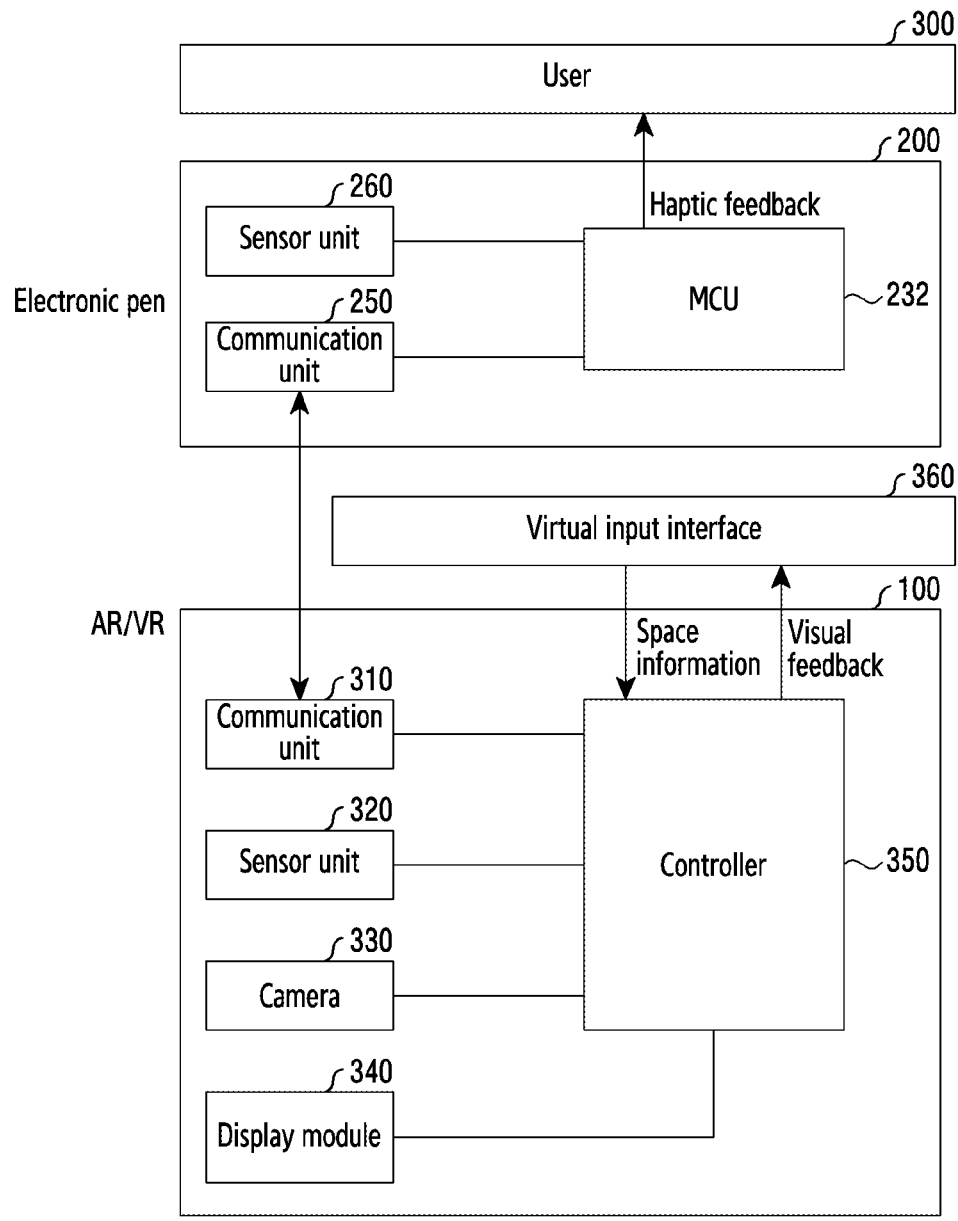
FIG. 3 is a block diagram illustrating an example operation performed between an electronic device and an input device according to various embodiments.

FIG. 3 is a block diagram illustrating an example operation performed between an electronic device and an input device according to various embodiments.

Referring to FIG. 3, the electronic device 100 may include a communication unit (e.g., including communication circuitry) 310, a sensor unit (e.g., including at least one sensor) 320, a camera 330, a controller (e.g., including processing and/or control circuitry) 350, and a display module (e.g., including a display) 340.

According to an embodiment, the communication unit 310 may include various communication circuitry and transmit a signal to the outside (e.g., the input device 200), or may receive from the outside. According to an embodiment, the communication unit may be a wireless communication unit (e.g., a cellular communication unit, a short-range wireless communication unit, or a global navigation satellite system (GNSS) communication unit). A corresponding communication unit among the communication units may communicate with the input device 200 via a first network (e.g., a short-range communication network such as Bluetooth, WiFi direct, or infrared data association (IrDA)) or a second network (e.g., a long-range communication network such as a cellular network, the Internet, or a computer network (e.g., LAN or WAN)). The communication unit 310 may be integrated as a single element (e.g., a single chip), or may be embodied as a plurality of different elements (e.g., a plurality of chips).

According to an embodiment, the communication unit 310 may include various communication circuitry and receive information associated with a movement of the input device 200. According to an embodiment, the communication unit 310 may transmit haptic information to the input device 200.

The sensor unit 320 may include various sensors, including, for example, and without limitation, a distance measurement sensor for sensing the distance to an object. However, this is not limited thereto, and the sensor unit 320 may include one or more sensors for sensing information associated with a surrounding environment. According to an embodiment, the sensor unit 320 may produce an electric signal or a data value corresponding to an internal operation state or an external environment state of the electronic device 100. For example, the sensor unit 320 may include at least one among a motion sensor, a sensor for sensing residual quantity of charge in a battery, a pressure sensor, an optical sensor, a temperature sensor, a geomagnetic field sensor, and a biometric sensor.

According to an embodiment, the camera 330 may photograph a still image and a video associated with a surrounding environment. According to an embodiment, the electronic device 100 may include at least one camera 330, and the camera 330 may obtain information associated with an object in a real space. According to an embodiment, the camera 330 may capture the image of eyes of a user 300, and may trace a line of sight of the user 300 based on the captured image of eyes. The camera 330 of the electronic device 100 may extract feature points of the image of eyes, and may detect the location of the eyes of the user 300. For example, the feature points of the image of eyes may be an edge, a corner, an image pattern, and/or a contour line. The electronic device 100 may compare the extracted feature points of the image of eyes and the detected location of the eyes, so as to trace the line of sight of the user 300.

According to an embodiment, the controller 350 may include various processing and/or control circuitry and a vision recognition unit and/or a haptic signal determination unit. In this instance, the vision recognition unit and/or haptic signal determination unit are to describe the controller 350 according to various embodiments, and do not intend to limit the configurations of the vision recognition unit and/or the haptic signal determination unit to separate pieces of hardware.

According to an embodiment, the vision recognition unit may include various circuitry and provide visual feedback to a virtual input interface 360 according to information of the input device 200 (e.g., the location of an input device or the inclination of an input device), space information, and an input signal. For example, the visual feedback may display virtual words to a user or may include a change (e.g., a change in color or size, or a visual wobbling effect) of the virtual input interface 360.

According to an embodiment, the display module 340 (e.g., the display 150 of FIG. 1) may include a display and display a virtual input interface produced by the controller 350. According to an embodiment, the display module 340 may include a light source, a condensing lens, and/or a wave guide, in order to provide an image produced by the controller 350 to the user 300. For example, light emitted from the light source may be transferred to eyes of a user via the condensing lens and the wave guide. The light source may be understood as a spontaneous light emission display that emits light from a display itself, or may be a display that reflects and emits light emitted from a separate light source. The condensing lens may concentrate light emitted from the light source to one end of the wave guide. The wave guide may include at least one among at least one diffraction element or reflection element (e.g., reflection mirror) The wave guide may guide light emitted from the light source to the eyes of the user 300 using at least one diffraction element or reflection element included in the wave guide. According to an embodiment, the wave guide may be formed of a transparent material on glass (not illustrated), so as not to obstruct the field of view of a user.

According to an embodiment, the haptic signal determination unit may determine a haptic related signal to be transmitted to the input device according to information associated with the input device 200 (e.g., the location of the input device, an inclination of the input device, or a change in movement of the input device), space information, and an input signal. For example, different haptic feedback may be provided when the input device is located in a predetermined (e.g., specified) area (e.g., a boundary area) of a virtual input interface and when the input device is located outside the predetermined area. The haptic signal determination unit may transmit haptic feedback related information to the communication unit 250 of the input device 200 via the communication unit 310, so as to provide haptic feedback to the user. According to another embodiment, haptic feedback may be changed in other forms. For example, haptic feedback may be changed to visual feedback (e.g., an output using a light emission device (not illustrated) included in the input device 200) and/or acoustic feedback (e.g., an output using a speaker (not illustrated) included in the input device 200). Feedback may be provided using two or more schemes.

The input device 200 may include the communication unit 250, the sensor unit 260, and the MCU 232. The description of FIG. 3 that corresponds to or is the same as or similar to the description that has been provided above may not be repeated.

According to an embodiment, the communication unit 250 may transmit a signal to the outside (e.g., the electronic device 100), or may receive from the outside.

According to an embodiment, the sensor unit 260 may include an acceleration sensor and a gyro sensor.

According to an embodiment, the MCU 232 may provide haptic feedback to the user 300. For example, the haptic feedback may be a mechanical stimulus (e.g., a vibration or a movement) that the user 300 is capable of perceiving the sense of touch or the sense of movement.

Figure 4:
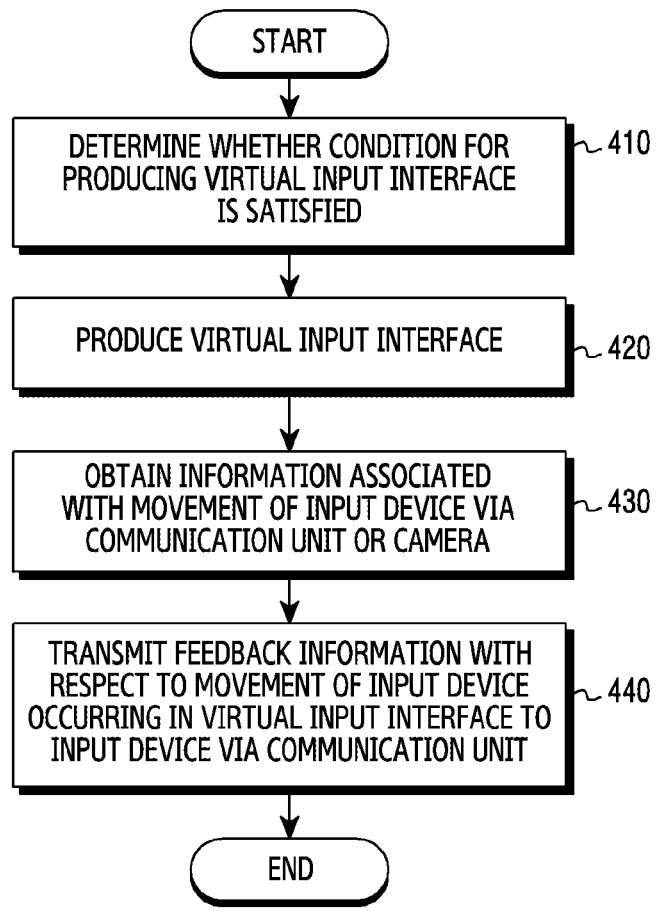
FIG. 4 is a flowchart illustrating an example operation of producing a virtual interface according to various embodiments.

FIG. 4 is a flowchart illustrating an example operation of producing a virtual interface according to various embodiments. In the embodiments hereinafter, operations may be performed sequentially, but it is not necessarily limited thereto. For example, the order of operations may be changed, and at least two operations may be performed in parallel. The subject of the operations in the flowchart may be understood as the electronic device 100 or the elements (e.g., the communication unit 310, the sensor unit 320, the camera 330, the controller 350, or the display module 340) of the electronic device 100.

According to an embodiment, the electronic device 100 may detect an event that requests production of a virtual interface. For example, an event that produces a virtual interface may be based on a request by a user (e.g., the user 300 of FIG. 3), the execution of an application, or a signal received from the outside. In the case that a virtual interface needs to be produced, the electronic device 100 proceeds with operations of FIG. 4.

Referring to FIG. 4, the electronic device 100 may obtain information associated with an object in a real space via the camera 330. According to an embodiment, when an event that requests periodic production of a virtual interface is detected or when a movement of the electronic device 100 is detected, the electronic device 100 may obtain information associated with an object in the real space via the camera 330. For example, the real space information obtained via the camera 330 may be substantially the same as the visual information that the user 300 obtains.

According to an embodiment, in operation 410, the electronic device 100 may determine, based on the object information obtained via the controller 350, whether a condition for producing a virtual input interface is satisfied. For example, whether a planar object is present in the real space may be determined.

According to an embodiment, in operation 420, the electronic device 100 may produce a virtual input interface in response to a result of the determination via the controller 350. For example, the location of the virtual input interface suitable for the determination result may be provided.

According to an embodiment, the virtual input interface may be provided in the form of a note, a canvas, or an application (e.g., a messenger, an SMS) execution window. According to an embodiment, the virtual input interface may be provided based on an application that is being executed or a service being provided in the electronic device 100.

According to an embodiment, the electronic device 100 may produce the virtual input interface on a planar object in the case that the planar object is present in the real space. For example, in the case that a planar object is present in a short distance to the user 300 (e.g., in a distance in which the user 300 is capable of providing input via the input device 200 or a body part of the user 300), the electronic device 100 may produce the virtual input interface on the planar object.

According to an embodiment, in the case that a planar object is not present in the real space, the virtual input interface may be produced based on virtual input interface production-related data received from the input device 200.

According to an embodiment, in operation 430, the electronic device 100 may obtain information associated with a movement of the input device 200 via at least one of the communication unit 310 and/or the camera 330. For example, a movement of the input device 200 may include at least one moving route input into the virtual input interface using the input device 200 or a body part of the user 300. As another example, a movement of the input device 200 may include a designated gesture input into the virtual input interface using the input device 200 or a body part of the user 300. According to an embodiment, the electronic device 100 may obtain information associated with a movement of the input device 200 via the communication unit 310. For example, the electronic device 100 may receive a sensor value based on a movement of the input device 200 from the input device 200 via the communication unit 310. As another example, the electronic device 100 may detect a change in the strength of a signal received from the input device 200 via the communication unit 310, and may detect a movement of the input device 200. According to an embodiment, the electronic device 100 may obtain information associated with a movement of the input device 200 via the camera 330. For example, the electronic device 100 may detect a movement of the input device 200 by tracing (or photographing an image and analyzing) the location of the input device 200 via the camera 330.

According to an embodiment, in operation 440, the electronic device 100 may transmit, to the input device 200 via the communication unit 310, a control signal that is determined based on a movement of the input device 200 occurring in a virtual input interface and is to control the input device 200. For example, the control signal may include information related to a feedback effect that the input device 200 is to provide to the user 300.

According to an embodiment, the electronic device 100 may transmit a control signal for controlling the input device 200 according to feedback information using wireless communication connected to the input device 200 via the communication unit 310.

Figure 5:
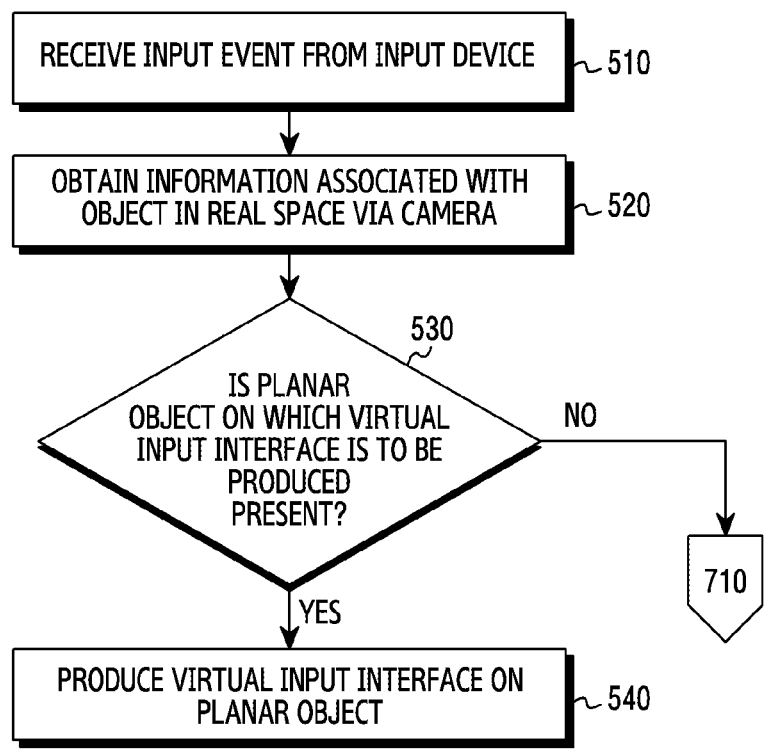
FIG. 5 is a flowchart illustrating an example process of producing a virtual input interface according to whether a condition for producing a virtual input interface is satisfied according to various embodiments.

FIG. 5 is a flowchart illustrating an example process of producing a virtual input interface according to whether a condition for producing a virtual input interface is satisfied in an embodiment. The operations illustrated in FIG. 5 may be performed as an example of operations 410 to 420 of FIG. 4.

Referring to FIG. 5, in operation 510, the electronic device 100 may receive an input event from the input device 200. For example, the input event may be a trigger for producing a virtual input interface, and may include at least one of execution of an application, a button input of the input device 200, a posture of gripping the input device 200 maintained during a predetermined period of time, and recognition of an external object via the camera 330.

As described in operation 410 of FIG. 4, in operation 520, the electronic device 100 may obtain information associated with an object in a real space via the camera 330.

As described in operation 420 of FIG. 4, in operation 530, the electronic device 100 may determine, using the controller 350, whether a planar object on which a virtual input interface is to be produced is present in the real space.

According to an embodiment, the electronic device 100 determines, using the controller 350, whether a planar object is present in the real space, and in the case that the planar object is present, the electronic device 100 may determine to produce a virtual input interface on the planar object in operation 540.

According to an embodiment, in the case that a planar object is not present in the real space, the electronic device 100 may determine not to produce a virtual input interface on a planar object.

This will be described in greater detail below with reference to FIG. 7.

Figure 6:
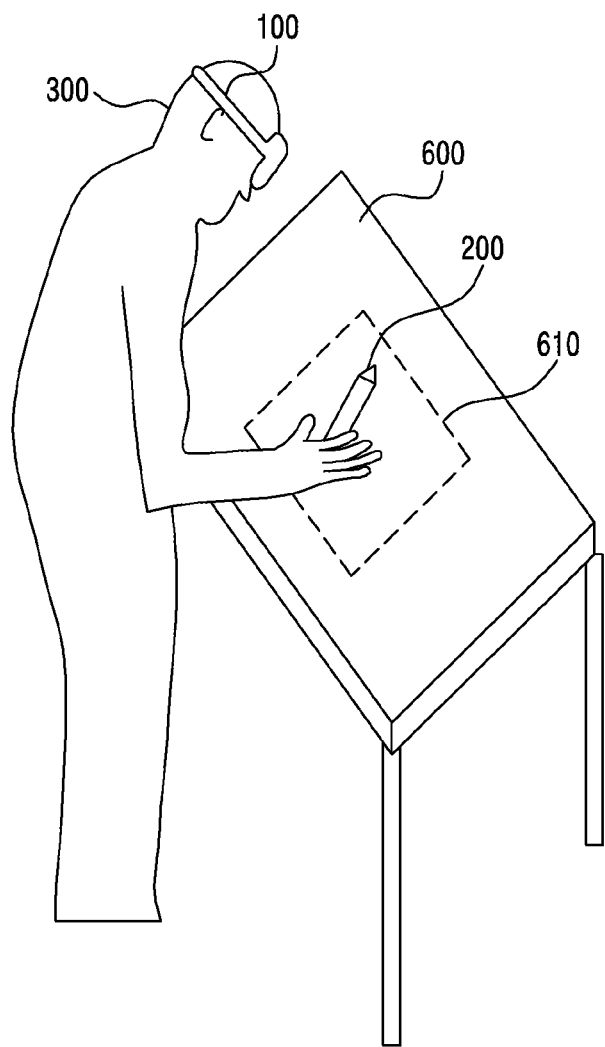
FIG. 6 is a diagram illustrating an example in which a virtual input interface is produced on a planar object according to various embodiments.

FIG. 6 is a diagram illustrating an example in which a virtual input interface is produced on a planar object according to various embodiments.

Referring to FIG. 6, the electronic device 100 according to an embodiment may recognize a planar object 600 existing in a real space via a camera, and may configure a virtual input interface area 610.

For example, the planar object may include an object including at least a predetermined area of a planar portion, an object including a large curved surface, or a solid-colored object without any pattern.

According to an embodiment, as illustrated in FIG. 6, in the case that the planar object 600 is present, the electronic device 100 may provide display of the virtual input interface area 610 based on the planar portion included in the object 600.

According to an embodiment, the electronic device 100 may recognize an area where room is easily secured such as a flat wall, a flat table, or the like, and may display the virtual input interface area 610 on the recognized area.

According to an embodiment, the virtual input interface area 610 may be displayed in the form of an outline or in the form of a simple 2D image, unlike a virtual input interface area displayed in a 3D space.

According to an embodiment, the electronic device 100 may correct or partially provide haptic information according to information associated with the detected planar object 600. For example, in the case that a virtual input interface is produced on a planar object, haptic feedback may not be separately provided.

According to an embodiment, the electronic device 100 may provide the virtual input interface area 610 in one of the various sizes according to body information of the user 300 (e.g., the location or length of an arm) or an input type (e.g., a long press).

According to an embodiment, the electronic device 100 may fix the spatial location of the virtual input interface area 610 or may move the area according to a movement or a direction of the user 300. For example, in the case that the user 300 moves the electronic device 100, the location and/or size of the virtual input interface area 610 may be changed based on the direction of a movement of the electronic device 100, and may be provided. As another example, in the case that the user 300 performs designated input (e.g., input of dragging an outline or an edge) to the virtual input interface area 610, the location and/or the size of the virtual input interface 620 may be changed and provided.

Figure 7:
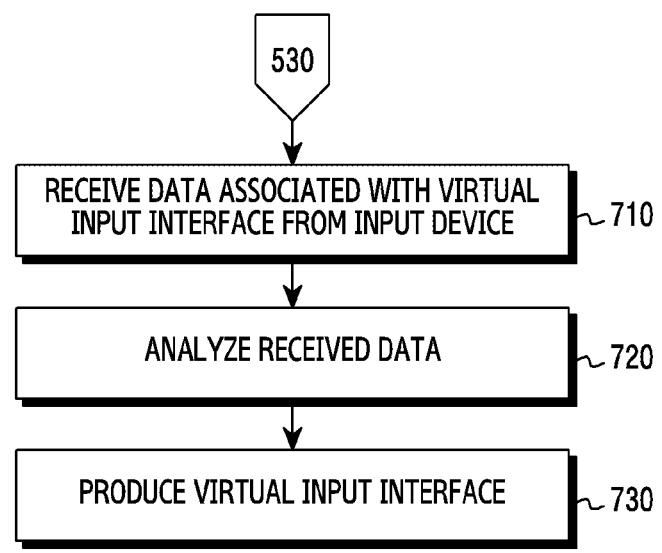
FIG. 7 is a flowchart illustrating an example process of producing a virtual input interface by receiving data associated with a virtual input interface from an input device according to whether a condition for producing a virtual input interface is satisfied according to various embodiments.

FIG. 7 is a flowchart illustrating an example process of producing a virtual input interface by receiving data associated with a virtual input interface from an input device based on whether a condition for producing a virtual input interface is satisfied according to various embodiments. The operations illustrated in FIG. 7 may, for example, be performed after operation 530 of FIG. 5.

Referring to FIG. 7, according to an embodiment, in the case that the electronic device 100 determines that a planar object on which a virtual input interface is to be produced is not present in the real space in operation 530 of FIG. 5, the electronic device 100 may receive data associated with production of a virtual input interface from an input device 200 in operation 710.

For example, the data associated with production of a virtual input interface may include data associated with state information of the input device 200 (e.g., a location of the input device 200 and/or an inclination of the input device 200).

According to an embodiment, in operation 720, the electronic device 100 may analyze the data received from the input device 200.

According to an embodiment, in operation 730, the electronic device 100 may produce a virtual input interface based on the data received from the input device 200.

According to an embodiment, the electronic device 100 may provide a method of spatially relocating a virtual input interface based on at least one piece of data associated with the location of the input device 200 and/or the inclination of the input device 200.

Figure 8:
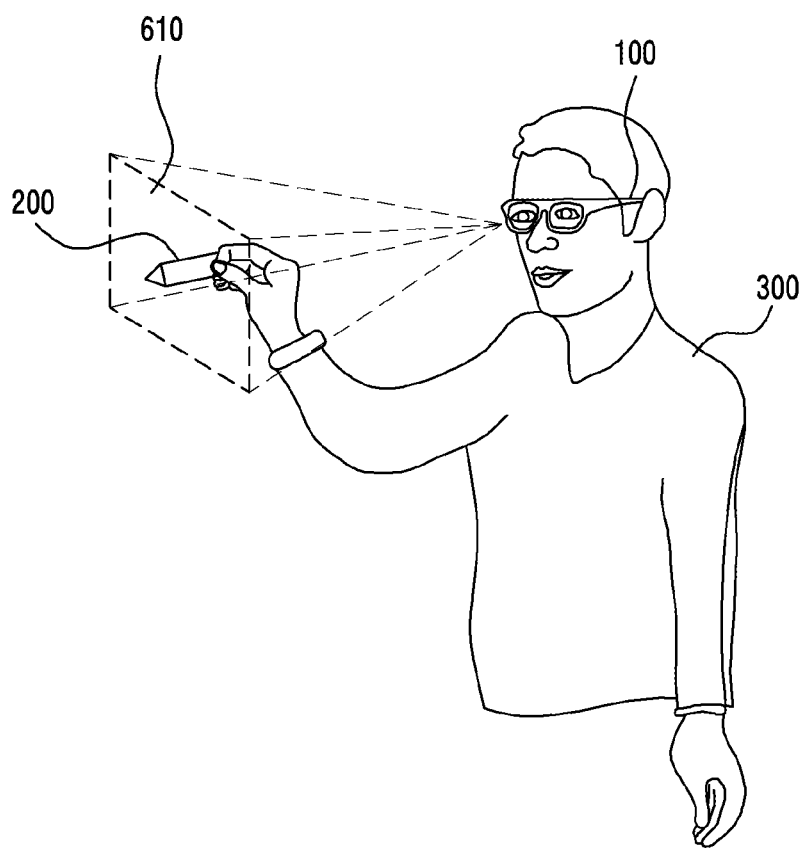
FIG. 8 is a diagram illustrating an example in which a virtual input interface is not produced on a planar object according to various embodiments.

FIG. 8 is a diagram illustrating an example in which a virtual input interface is not produced on a planar object according to various embodiments. The description of FIG. 8 that corresponds to or is the same as or similar to the description that has been provided above may not be repeated here.

Referring to FIG. 8, based on data received from the input device 200, the electronic device 100 according to an embodiment may set a location in which the virtual input interface area 610 is to be displayed. For example, a virtual input interface may be determined as a predetermined area in a 2D or 3D form.

According to an embodiment, the electronic device 100 may configure the virtual input interface area 610 based on at least one of the location of a line of sight of the user 300 and the location of a hand (or the location of the input device 200). For example, the electronic device 100 may include a sight line tracking sensor (or the camera 330) capable of tracking a line of sight of a user, and may set an area at which the line of sight of the user stays during a designated period of time as a location in which the virtual input interface area 610 is to be displayed. As another example, based on the location information of the input device 200 received from the input device 200 or based on the location information of the input device 200 included in image data received via a camera, the electronic device 100 may set a location in which the virtual input interface area 610 is to be displayed.

According to an embodiment, in the case that the movement information of the input device 200 is produced within the configured virtual input interface area 610, the electronic device 100 may analyze the corresponding movement and may display the same via the display module 340.

According to an embodiment, in the case that haptic feedback information is designated in the virtual input interface area 610 and the input device 200 is located in the corresponding area, the electronic device 100 may provide an effect that enables the user 300 to feel as if the user would perform input on a real object. For example, in the case that the user 300 writes on the virtual input interface area 610 via the input device 200, there is provided an effect that enables a user to feel as if the user would perform input on a real object via haptic feedback.

According to an embodiment, the electronic device 100 may correct haptic information so that the user 300 experiences various feeling of handwriting. For example, haptic feedback that enables the user 300 to feel as if the user were writing on the surface of glass or the surface of a paper.

According to an embodiment, in the case that the user 300 writes in the virtual input interface area 610, the electronic device 100 may transmit a control signal that performs control so that the input device 200 provides haptic feedback based on movement information of the input device 200 (e.g., sensing information of the sensor unit 260). For example, in the case that the input device 200 receives, from the electronic device 100, a control signal for controlling provision of haptic feedback, the input device 200 may periodically detect a movement of the input device 200 via the sensor unit 260, and may provide haptic feedback corresponding to the movement. Based on a speed or direction of a movement, the input device 200 may correct haptic information and provide the same to the user 300 so that the user may experience various feeling of handwriting.

Figure 9:
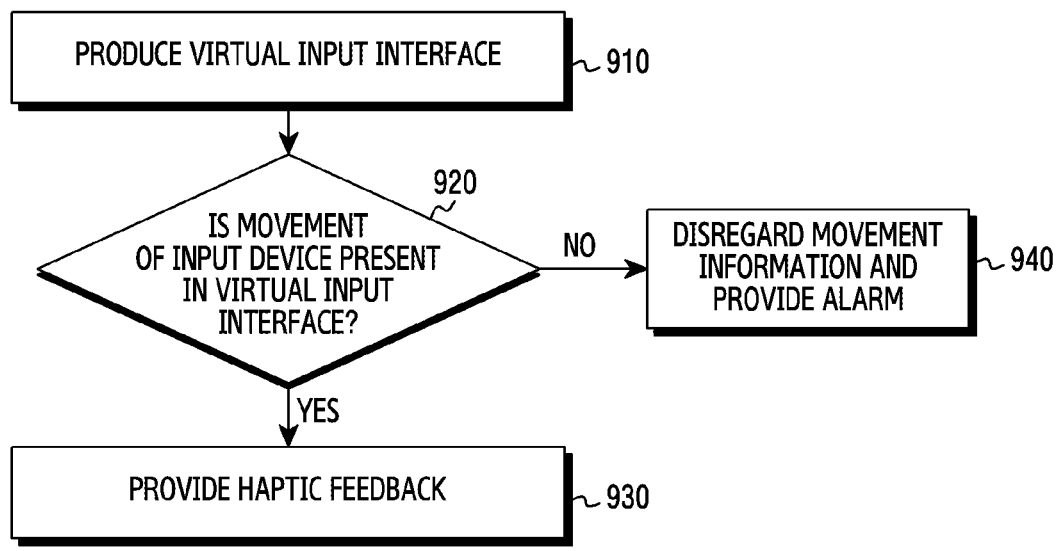
FIG. 9 is a flowchart illustrating an example process of disregarding a movement and providing an alarm when a movement of an input device occurs outside a virtual input interface-related area according to various embodiments.

FIG. 9 is a flowchart illustrating an example process of disregarding a movement and providing an alarm when a movement of an input device occurs outside a virtual input interface-related area according to various embodiments.

Referring to FIG. 9, according to an embodiment, in operation 910, the electronic device 100 may produce a virtual input interface. This has been described in detail with reference to operation 420 of FIG. 4 and FIGS. 5 to 8, and detailed descriptions thereof may not be repeated here.

According to an embodiment, in operation 920, via at least one of a communication unit and a camera, the electronic device 100 may determine whether a movement of the input device 200 is present in a virtual input interface area.

According to an embodiment, in the case that the electronic device 100 determines that a movement of the input device 200 is present in the virtual input interface area, the electronic device 100 may display movement information via the display module 340 and may provide corresponding feedback in operation 930. For example, the display module 340 may display information that the controller 350 produces based on the movement of the input device 200. For example, the controller 350 may produce feedback information (e.g., haptic information) based on the movement of the input device 200, and may transmit the same to the input device 200 via the communication unit 310.

According to an embodiment, in the case that the electronic device 100 determines that a movement of the input device 200 is present outside the virtual input interface area, the electronic device 100 may disregard movement information and may provide an alarm in operation 940.

According to an embodiment, a movement of the input device 200 outside the virtual input interface area determined in a 2D or 3D form may be regarded as invalid information.

According to an embodiment, the provided alarm may include at least one of visual feedback, vibration feedback, or voice feedback. For example, in the case that the input device 200 inputs letters or drawing in the virtual input interface area and happens to deviate and enter another area (e.g., an area different from the virtual input interface), an alarm indicating that the input device 200 has moved to another area may be provided by providing a strong vibration during a predetermined period of time.

Figure 10A:
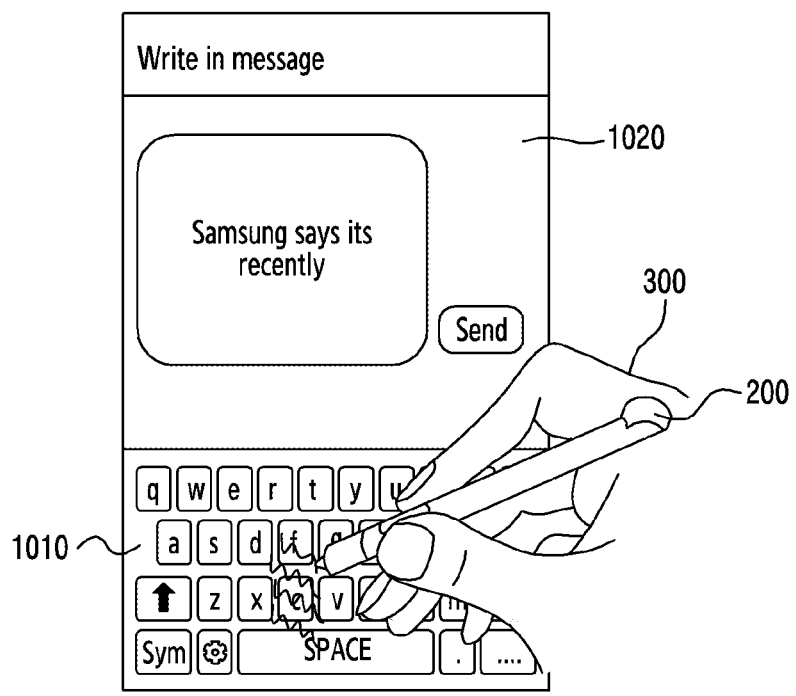
FIG. 10A is a diagram illustrating an example in which an input unit and an output unit are provided together in a virtual input interface when an application is executed according to various embodiments.

FIG. 10A is a diagram illustrating an example in which a virtual input unit UI and a virtual output unit UI are provided together in a virtual input interface when an application is executed according to various embodiments.

Referring to FIG. 10A, based on depth information of a line of sight of the user 300 or detected surrounding environment, the electronic device 100 according to an embodiment may display an application (e.g., an SMS or a messenger) and may provide a related function to the user 300.

According to an embodiment, the electronic device 100 may display a virtual input interface (e.g., the virtual input interface area 610 of FIG. 8) to include a virtual input unit UI 1010 and a virtual output unit UI 1020 of an application. For example, the user 300 may directly perform input to the virtual input unit UI 1010 of the virtual input interface area 610.

According to an embodiment, the electronic device 100 may operate (e.g., input, store, or transmit) an application based on information input to the virtual input unit UI 1010. For example, the electronic device 100 may perform input to an application based on information (e.g., information associated with an operation that performs input) detected in the virtual input unit UI 1010. According to an embodiment, the controller 350 may detect movement information of the input device 200 occurring in the virtual input unit UI 1010 via the communication unit 310 or the camera 330, may perform an operation (e.g., inputting, storing, or transmitting) of an application based on the detected information, and may provide an updated virtual input interface to the user 300 via the display module 340. For example, a virtual output unit UI 1020 based on the movement information detected in the virtual input unit UI 1010 may be displayed via the display module 340.

Figure 10B:
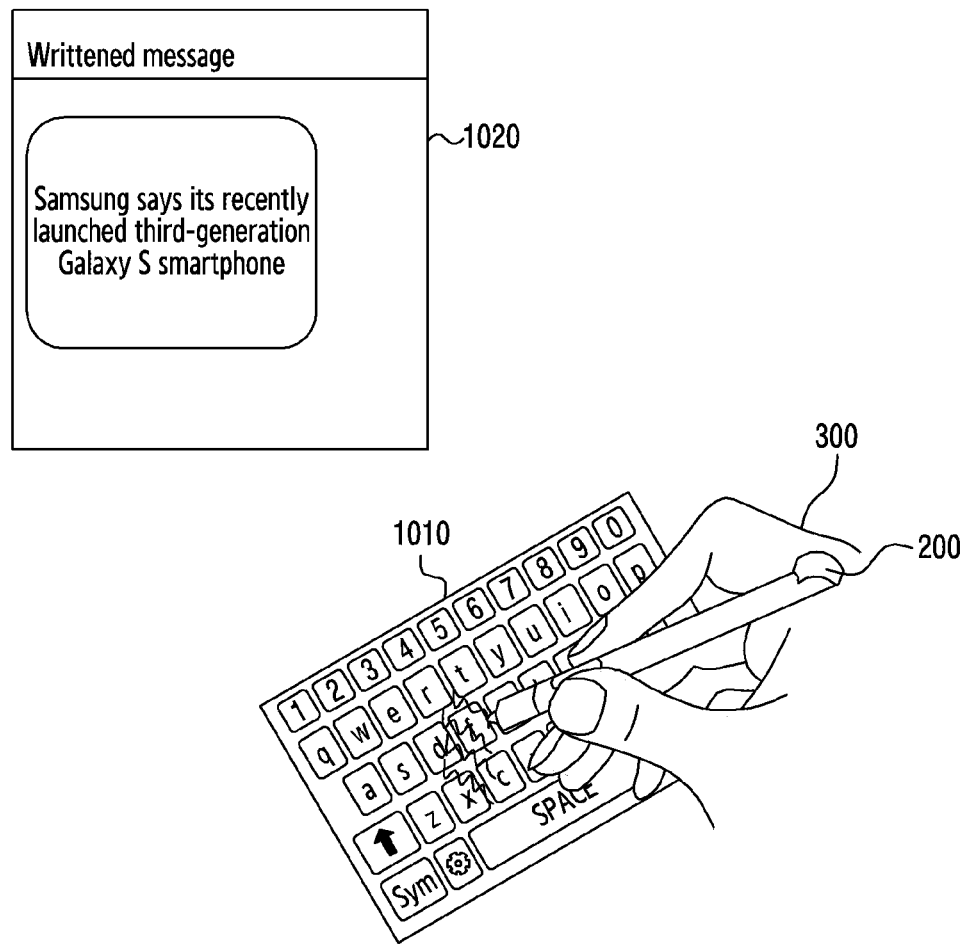
FIG. 10B is a diagram illustrating an example in which a virtual input interface is produced in a manner in which an input unit is separately provided when an application is executed according to various embodiments.

FIG. 10B is a diagram illustrating an example in which a virtual input interface is produced in a manner in which an input unit is separated when an application is executed according to various embodiments. The description of FIG. 10B that corresponds to or is the same as or similar to the description that has been provided above may not be repeated here.

Referring to FIG. 10B, the electronic device 100 may provide a method of spatially relocating the location of the virtual input unit UI 1010 in the case that the location of an input unit of an application is different from the location of the input device 200 (e.g., the location of the end of an electronic pen). For example, the virtual input unit UI 1010 may be provided separately from the virtual output unit UI 1020. According to an embodiment, the electronic device 100 may separately display the virtual output unit UI 1020 for providing information to a user and the virtual input unit UI 1010 for receiving input from a user. For example, the controller 350 may produce the virtual output unit UI 1020 in a location corresponding to a line of sight of a user, may produce the virtual input unit UI 1010 in a location corresponding to the location of the input device 200, and may display the same via the display module 340. According to an embodiment, the controller 350 may detect movement information of the input device 200 occurring in the virtual input unit UI 1010 via communication unit 310 or the camera 330, and may display the virtual output unit UI 1020 based on the detected information via the display module 340.

Figure 11:
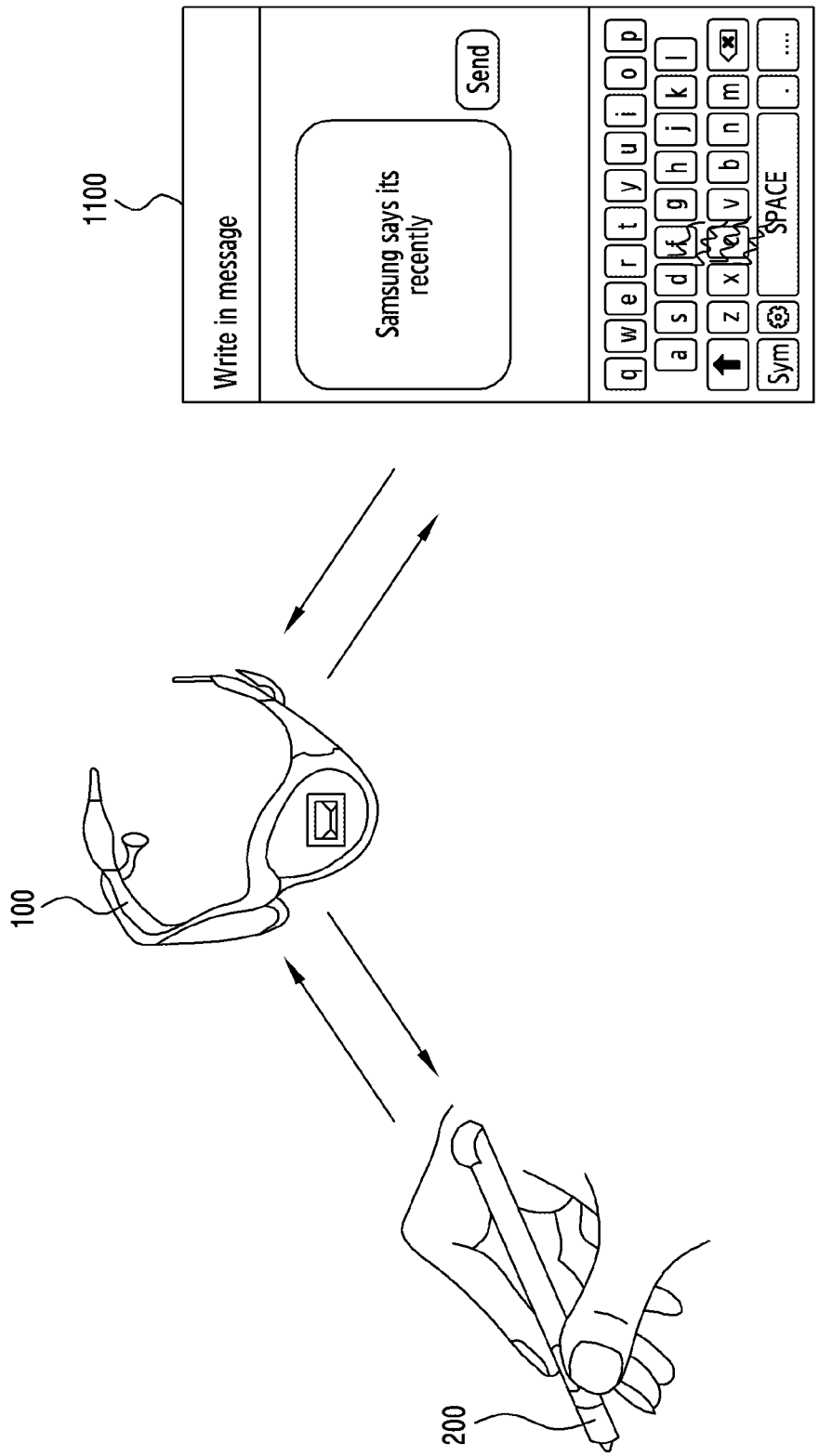
FIG. 11 is a diagram illustrating an example operation performed among an electronic device, an external device, and an input device according to various embodiments.

FIG. 11 is a flowchart illustrating example operations performed among the electronic device 100, an external device 1100, and the input device 200 according to various embodiments.

According to an embodiment, in the case that the electronic device 100 is an AR electronic device, the external device 1100 may receive camera shot image information from the electronic device 100, may produce a rendered image that the electronic device 100 needs to display, and may transmit the same to the electronic device 100.

According to an embodiment, in the case that a virtual input interface needs to be displayed (e.g., input is received via an input device or an application executed in the external device), the external device 1100 may transmit a rendered image including a virtual input interface to the electronic device 100.

According to an embodiment, the electronic device 100 may transmit, to the external device 1100, sensor information or input information received from the input device 200 and/or an image (an image of the location of a pen) received from a camera.

According to an embodiment, the external device 1100 may transmit a feedback related signal based on received information and/or may transmit a rendered image produced based on the received information to the electronic device 100, and the electronic device 100 may display the received rendered image via the display module 340, and may transmit the received feedback related signal to the input device 200. According to an embodiment, the electronic device 100 may provide feedback to a user via the elements (e.g., the display module 340 or a speaker) of the electronic device 100 based on the feedback related signal received from the external device 1100.

According to an embodiment, in the case that the electronic device 100 is a VR electronic device, the external device 1100 may receive sensor information or location information of the input device 200 from the electronic device 100, and may provide a virtual input interface in an image provided to the electronic device 100.

According to an embodiment, in the case that a VR electronic device does not include a camera, the electronic device 100 may recognize an object based on the strength of a signal from the external device 1100, or via mmWave.

According to an embodiment, an antenna module may emit a transmission signal to the outside, and may receive a reflection signal corresponding to the transmission signal reflected by an external object. According to an embodiment, the antenna module may include a mmWave antenna module that uses a high-frequency band. For example, the mmWave antenna module may use a frequency band such as 28 GHz, 39 GHz, or 60 GHz. According to an embodiment, the antenna module may be configured or formed in an array form, and may intensively transmit a signal in a predetermined direction via beamforming technology. For example, the antenna module may receive a reflection signal of a transmission signal via beamforming technology and may recognize the location of an external object and the features of the external object (e.g., the shape of an external object or a variation). For example, the antenna module may receive a reflection signal of a transmission signal via beamforming technology, and may recognize a user gesture or the location and movement of the input device.

Figure 12:
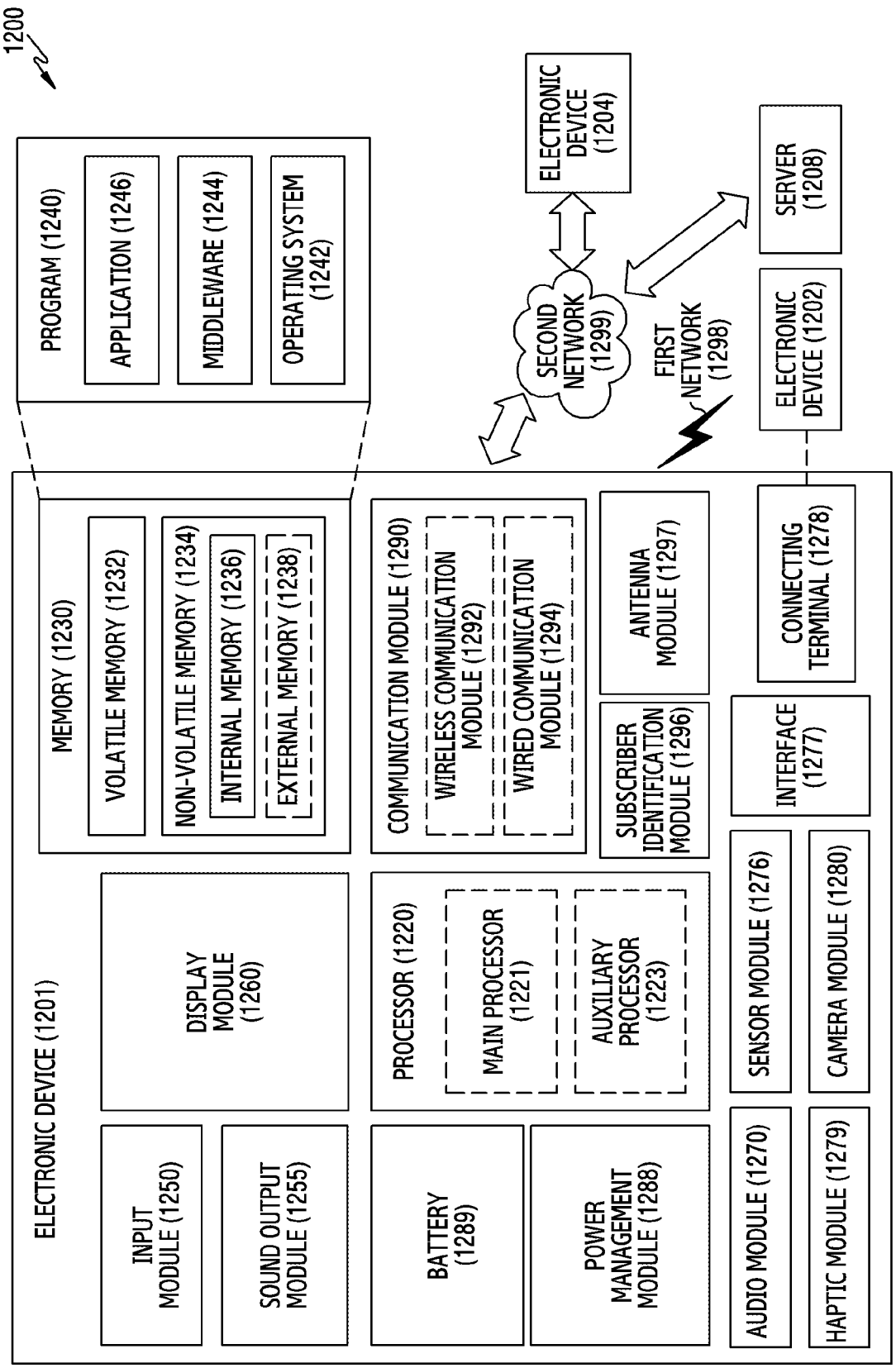
FIG. 12 is a block diagram illustrating an example electronic device in a network environment according to various embodiments.

FIG. 12 is a block diagram illustrating an example electronic device 1201 (e.g., the electronic device 100 of FIG. 1) in a network environment 1200 according to various embodiments. Referring to FIG. 12, the electronic device 1201 in the network environment 1200 may communicate with an electronic device 1202 (e.g., the input device 200) via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220 (e.g., the MCU 232 or the controller 350 of FIG. 3), memory 1230, an input module 1250, a sound output module 1255, a display module 1260 (e.g., the display module 340 of FIG. 3), an audio module 1270, a sensor module 1276 (e.g., the sensor unit 260 or the sensor unit 320), an interface 1277, a connecting terminal 1278, a haptic module 1279, a camera module 1280 (e.g., the camera 330 of FIG. 3), a power management module 1288, a battery 1289, a communication module 1290 (e.g., the communication unit 250 or the communication unit 310 of FIG. 3), a subscriber identification module (SIM) 1296, or an antenna module 1297. In various embodiments, at least one of the components (e.g., the connecting terminal 1278) may be omitted from the electronic device 1201, or one or more other components may be added in the electronic device 1201. In various embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to an embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™ wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element including a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201.

According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In an embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 100 of FIG. 1) according to an example embodiment may include a communication unit (e.g., the communication unit 310 of FIG. 1) comprising communication circuitry configured to communicate with an input device (e.g., the input device 100 of FIG. 2A or the input device 210 of FIG. 2B), a camera (e.g., the camera 330 of FIG. 1), and at least one processor (e.g., the controller 350 of FIG. 3) operatively connected to the communication unit and the camera, and the at least one processor is configured to: determine whether a condition for producing a virtual input interface is satisfied, produce the virtual input interface based on the determination, obtain information associated with a movement of the input device via at least one of the communication unit or the camera, and transmit, to the input device via the communication unit, a control signal determined based on the movement of the input device occurring in the virtual input interface and to control the input device.

According to an example embodiment, the at least one processor may be configured to receive an input event associated with the production of the virtual input interface from the input device using the communication unit.

According to an example embodiment, the input event associated with the production of the virtual input interface may include at least one of a button input of the input device and a posture of gripping the input device.

According to an example embodiment, the at least one processor may be configured to obtain information associated with an object in a real space via the camera, and to determine whether a condition for producing the virtual input interface is satisfied based on the obtained object information.

According to an example embodiment, in the case that the determination shows that the condition for producing the virtual input interface is satisfied, the at least one processor may be configured to produce, based on the obtained information associated with the object in the real space, the virtual input interface on a planar object existing in the real space.

According to an example embodiment, in the case that the determination shows that the condition for producing the virtual input interface is not satisfied, the at least one processor may be configured to receive data associated with the virtual input interface from the input device, and to produce the virtual input interface based on the received data.

According to an example embodiment, the received data may include a location and an inclination of the input device.

According to an example embodiment, the input device may include an electronic pen configured to interoperate with the electronic device.

According to an example embodiment, the electronic device may further include a display, and the at least one processor may be configured to control the display to display information associated with the movement of the input device.

According to an example embodiment, the at least one processor may be configured to disregard information associated with the movement of the input device that deviates from the virtual input interface, According to an example embodiment, the at least one processor may be configured to provide an alarm based on the movement of the input device deviating from the virtual input interface.

According to an example embodiment, based on an application being executed, the at least one processor may be configured to produce a virtual input interface based on a part of the application in response to an input event from the input device.

According to an example embodiment, based on the application being executed, the at least one processor may be configured to produce a virtual input interface based on an input unit of the application in response to the input event from the input device.

According to an example embodiment, based on the application being executed, the at least one processor may be configured to produce a virtual input interface based on an input unit of the application in response to the input event from the input device.

As described above, a method of operating an electronic device (e.g., the electronic device of FIG. 1) according to an example embodiment may include: (operation 410 of FIG. 4) determining whether a condition for producing a virtual input interface is satisfied, (operation 410 of FIG. 4) producing the virtual input interface based on the determination, (operation 420 of FIG. 4) obtaining information associated with a movement of an input device via at least one of a communication unit or a camera, and (operation 430 of FIG. 4) transmitting, to the input device via the communication unit, a control signal determined based on the movement of the input device occurring in the virtual input interface and is to control the input device.

According to an example embodiment, the method of operating the electronic device may include: obtaining information associated with an object in a real space via the camera, and determining, based on the obtained object information, whether a condition for producing a virtual input interface is satisfied.

According to an example embodiment, based on the determination showing that a condition for producing the virtual input interface is satisfied, the method of operating the electronic device may include producing, based on the obtained information associated with the object in the real space, the virtual input interface on a planar object existing in the real space.

According to an example embodiment, based on the determination showing that a condition for producing the virtual input interface is not satisfied, the method may include: receiving data associated with the virtual input interface from the input device and producing the virtual input interface based on the received data.

As described above, an input device (e.g., the input device 200 of FIG. 2A or the input device 210 of FIG. 2B) according to an example embodiment may include: a communication unit (e.g., the communication unit 250 of FIG. 2C comprising communication circuitry configured to communicate with the electronic device (e.g., the electronic device 100 of FIG. 1), a driving unit (e.g., the driving unit 240 of FIG. 2C), a sensor unit including at least one sensor (e.g., the sensor unit 260 of FIG. 2C), and a communication unit comprising communication circuitry, and at least one processor (e.g., the controller 230 of FIG. 2C) operatively connected to the communication unit, the driving unit, and the sensor unit (e.g., the sensor unit 260 of FIG. 2C), and the communication unit, and at least one processor (e.g., the controller 230 of FIG. 2C) operatively connected to the driving unit and the sensor unit, and the at least one processor is configured to: transmit, to the electronic device via the communication unit, information associated with a movement of the input device detected by the sensor unit, obtain a control signal determined based on the movement of the input device from the electronic device via the communication unit in response to the transmitted information associated with the movement, and control the driving unit to provide, a feedback effect corresponding to the obtained control signal.

In the input device according to an example embodiment, the feedback effect may include at least one of a visual effect, an acoustic effect, or a haptic effect.

In the input device according to an example embodiment, the driving unit may further include a haptic module including haptic circuitry, and the at least one processor may be configured to control the haptic module according to the obtained control signal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment (s) described herein.

What is claimed is:

1. An electronic device comprising:
   a communication unit comprising communication circuitry configured to communicate with an input device;
   a camera; and
   at least one processor operatively connected to the communication unit and the camera,
   wherein the at least one processor is configured to:
   determine whether a condition for producing a virtual input interface is satisfied;
   produce the virtual input interface including a first portion for providing information to a user and a second portion for receiving an input from the user based on the determination;
   obtain information associated with a movement of the input device by the user via at least one of the communication unit or the camera; and
   transmit, to the input device via the communication unit, a control signal determined based on the movement of the input device by the user occurring in the virtual input interface,
   wherein the first portion and the second portion are separately produced based respectively on a line of sight of the user and a location of the input device used by the user.

2. The electronic device of claim 1, wherein the at least one processor is configured to receive an input event associated with the production of the virtual input interface from the input device using the communication unit.

3. The electronic device of claim 2, wherein the input event associated with the production of the virtual input interface comprises at least one of a button input of the input device and a posture of gripping the input device.

4. The electronic device of claim 1, wherein the at least one processor is configured to:
   obtain information associated with an object in a real space via the camera; and
   determine whether a condition for producing the virtual input interface is satisfied based on the obtained object information.

5. The electronic device of claim 4, wherein, based on the determination showing that the condition for producing the virtual input interface is satisfied, the at least one processor is configured to produce, based on the obtained information associated with the object in the real space, the virtual input interface on a planar object existing in the real space.

6. The electronic device of claim 4, wherein, based on the determination showing that the condition for producing the virtual input interface is not satisfied, the at least one processor is configured to:
- receive data associated with the virtual input interface from the input device; and
- produce the virtual input interface based on the received data.

7. The electronic device of claim 6, wherein the received data comprises the location of the input device and an inclination of the input device.

8. The electronic device of claim 1, wherein the input device includes an electronic pen configured to interoperate with the electronic device.

9. The electronic device of claim 1, further comprising a display,
- wherein the at least one processor is configured to control the display to display information associated with the movement of the input device.

10. The electronic device of claim 1, wherein the at least one processor is configured to disregard information associated with the movement of the input device that deviates from the virtual input interface.

11. The electronic device of claim 1, wherein the at least one processor is configured to provide an alarm based on the movement of the input device deviating from the virtual input interface.

12. The electronic device of claim 1, wherein, when an application is executed, the at least one processor is configured to produce the virtual input interface based on a part of the application in response to an input event from the input device.

13. The electronic device of claim 1, wherein, when an application is executed, the at least one processor is configured to produce the second portion of the virtual input interface based on an input of the application in response to the input event from the input device.

14. A method of operating an electronic device, the method comprising:
- determining whether a condition for producing a virtual input interface is satisfied;
- producing the virtual input interface including a first portion for providing information to a user and a second portion for receiving an input from the user based on the determination;
- obtaining information associated with a movement of an input device by the user via at least one of a communication unit or a camera, the communication unit comprising communication circuitry; and
- transmitting, to the input device via the communication unit, a control signal determined based on the movement of the input device by the user occurring in the virtual input interface,
- wherein the first portion and the second portion are separately produced based respectively on a line of sight of the user and a location of the input device used by the user.

15. The method of claim 14, comprising:
- obtaining information associated with an object in a real space via the camera; and
- determining, based on the obtained object information, whether a condition for producing a virtual input interface is satisfied.

* * * * *